US012453827B2

(12) United States Patent
Kahn

(10) Patent No.: US 12,453,827 B2
(45) Date of Patent: Oct. 28, 2025

(54) NEBULIZER GAS SCAVENGER SYSTEM WITH MEDICATION RECYCLING AND CONSUMPTION METERING

(71) Applicant: Yale University, New Haven, CT (US)

(72) Inventor: Peter Kahn, Bronx, NY (US)

(73) Assignee: Yale University, New Haven, CT (US)

( * ) Notice: Subject to any disclaimer, the term of this patent is extended or adjusted under 35 U.S.C. 154(b) by 832 days.

(21) Appl. No.: 17/680,154

(22) Filed: Feb. 24, 2022

(65) Prior Publication Data

US 2023/0263975 A1 Aug. 24, 2023

(51) Int. Cl.

*A61M 16/00* (2006.01)
*A61M 1/00* (2006.01)
*A61M 16/08* (2006.01)
*A61M 16/20* (2006.01)

(52) U.S. Cl.

CPC .......... *A61M 16/0054* (2013.01); *A61M 1/70* (2021.05); *A61M 1/784* (2021.05); *A61M 16/009* (2013.01); *A61M 16/0808* (2013.01); *A61M 16/208* (2013.01); *A61M 2205/3379* (2013.01); *A61M 2205/3606* (2013.01); *A61M 2205/3673* (2013.01)

(58) Field of Classification Search
CPC .. A61M 11/00; A61M 11/02; A61M 15/0085; A61M 16/161; A61M 16/1055; A61M 16/0808; A61M 2205/3606; A61M 2205/3379; F25B 21/02; B01D 53/265; B01D 5/0042
USPC .......................................................... 63/3.4
See application file for complete search history.

(56) References Cited

U.S. PATENT DOCUMENTS 4,219,020 A 8/1980 Czajka
4,347,894 A * 9/1982 Gerlach .............. F28D 21/0001 165/169
4,807,617 A 2/1989 Nesti
5,127,411 A 7/1992 Schoolman et al.
5,277,175 A * 1/1994 Riggs ................ A61M 16/0858 128/203.14
5,419,317 A * 5/1995 Blasdell ................ A61M 16/06 128/205.19

(Continued)

OTHER PUBLICATIONS

P.P.H. Le Brun, A.H. de Boer, H.G.M. Heijerman and H.W. Frijlink. A review of the technical aspects of drug nebulization. Pharm World Sci 2000;22(3): 75-81.

(Continued)

*Primary Examiner* — Colin W Stuart
*Assistant Examiner* — Douglas Y Sul
(74) *Attorney, Agent, or Firm* — Barclay Damon LLP; Anthony P. Gangemi

(57) ABSTRACT

The nebulizer gas scavenging system includes a condenser positioned in the expiratory pathway of the breathing circuit for extracting liquid from expiratory gases and redirecting the extracting liquid to the input of the nebulizer. The system is further configured to detect the actual consumption of inhaled medication by measuring the concentration of medication in the expiratory pathway and comparing it to the initial content of medication in the aerosol of the inspiratory pathway. A more accurate determination of the amount of inhaled medication is advantageous in certain critical situations involving application of medication by inhalation.

18 Claims, 2 Drawing Sheets

(56) References Cited

U.S. PATENT DOCUMENTS

| | | | |
|---|---|---|---|
| 5,636,627 A | 6/1997 | Rochester | |
| 5,715,813 A | 2/1998 | Guevrekian | |
| 6,134,914 A * | 10/2000 | Eschwey | F25J 3/0695 |
| | | | 62/925 |
| 6,263,874 B1 | 7/2001 | LeDez et al. | |
| 6,405,539 B1 * | 6/2002 | Stach | B01J 20/18 |
| | | | 62/3.4 |
| 6,729,329 B2 * | 5/2004 | Berry | A61M 16/009 |
| | | | 128/205.12 |
| 7,297,120 B2 | 11/2007 | Tsukashima et al. | |
| 9,314,766 B2 | 4/2016 | Filipovic et al. | |
| 10,335,569 B2 | 7/2019 | Beard et al. | |
| 2005/0155380 A1 * | 7/2005 | Rock | A61M 16/009 |
| | | | 62/617 |
| 2006/0254586 A1 * | 11/2006 | Berry | A61M 16/0093 |
| | | | 128/203.14 |
| 2010/0122706 A1 | 5/2010 | Moenning | |
| 2013/0220314 A1 | 8/2013 | Bottom | |
| 2015/0352299 A1 * | 12/2015 | Cortez, Jr. | A61M 16/147 |
| | | | 128/200.14 |
| 2017/0007795 A1 | 1/2017 | Pedro et al. | |
| 2017/0216552 A1 * | 8/2017 | Goff | A61M 11/005 |
| 2017/0319104 A1 * | 11/2017 | Hijnen | A61B 5/4875 |
| 2019/0275275 A1 | 9/2019 | Brown | |
| 2020/0054558 A1 | 2/2020 | Boucher et al. | |
| 2021/0041416 A1 | 2/2021 | Chou | |
| 2021/0205557 A1 | 7/2021 | Hunt et al. | |
| 2023/0380414 A1 * | 11/2023 | Jones | A61M 16/14 |
| 2024/0059591 A1 * | 2/2024 | Jaffrey | C02F 1/46109 |

OTHER PUBLICATIONS

Arzu Ari, Armele Dornelas de Andrade, Meryl Sheard, Bshayer AlHamad, and James B. Fink. Performance Comparisons of Jet and Mesh Nebulizers Using Different Interfaces in Simulated Spontaneously Breathing Adults and Children. Journal of Aerosol Medicine and Pulmonary Drug Delivery, vol. 28, No. 4, 2015.

* cited by examiner

NEBULIZER GAS SCAVENGER SYSTEM WITH MEDICATION RECYCLING AND CONSUMPTION METERING

BACKGROUND

Without limiting the scope of the invention, its background is described in connection with nebulizers. More particularly, the invention describes a system for detecting and measuring drug consumption when the nebulized aerosol is inhaled by the patient, as well as extracting the drug from the exhalation pathway and re-directing it back to the inhalation pathway to increase drug consumption by the patient.

Medication delivery through inhalation by a patient is generally well known and used in a variety of circumstances. In particular, pulmonary treatments, such as inhalation of albuterol, are frequently prescribed for patients to apply at home. Inhalation delivery route is also used during surgery when the patient is subjected to anesthesia, as well as in certain dental procedures.

In a typical scenario, a facemask, a nasal cannula, a mouthpiece, or a face hood is positioned next to the patient's face so as to control the inspiratory flow and the expiratory flow in and out of the patient. A source of desired medication, such as an inhalation drug or an anesthetic in some examples, is used to create a flow of gas desired to be inhaled by the patient. The flow of gas is then directed to the facemask and from there it is inhaled by the voluntary action of the lungs or injected by the machine under controlled conditions.

Exhaled gases are directed outwards and away from the face of the patient in the expiratory pathway. These exhaled gases may be filtered or otherwise processed before releasing into the ambient environment.

Medical nebulizers for aerosolizing a liquid medication that can be inhaled by a patient are well-known devices commonly used for the treatment of certain conditions and diseases. Nebulizers have applications in treatments for conscious, spontaneously-breathing patients and for controlled ventilated patients.

Expiratory gas scavenging also is known in broad terms to be used for the retrieval of volatile gas agents that may be toxic or undesirable if released in the same room. These gases are typically filtered out or otherwise removed from the expiratory pathway by various means. It has been long recognized that salvaging these gases and recycling them back into the inhalation pathway may provide significant benefits, such as reduction of environmental harm, saving cost, and protecting medical personnel surrounding the patient, to name a few. However, no such practical system has been developed so far despite multiple attempts described in the prior art.

Redirecting medication from the expiratory pathway back into the patient input side of the breathing circuit may also be desirable when expensive medication is used. Any portion of the medication that is exhaled by the patient may be considered wasted and not properly consumed by the patient. A need is therefore to increase the consumption of medication by the patient in order to maximize the medication benefit and minimize the amount of medication used during the procedure.

Another drawback of the present systems is the lack of precise control as to how much of the medication inhaled by the patient is actually consumed versus how much of it is exhaled and therefore not absorbed by the patient's lungs. This is most important for the most critically ill patients, where exact knowledge of medication consumption is needed for the best patient care. Some examples of the most critical circumstances requiring close control of the amount of inhaled and consumed medication include (i) ribavirin treatment for RSV infections in neonates, (ii) acute exacerbations of asthma where nebulized albuterol is key to treatment of this condition, and (iii) acute exacerbations of COPD where nebulized medication is a key component to therapy.

The need to recycle the active medication has to be balanced with the need to sterilize the exhaled gases and remove harmful pathogens prior to reintroduction to the patient. This will avoid a risk of contamination of subsequent patients in case the same machine is used for more than one patient. The need exists therefore for a breathing system capable of measuring medication consumption more accurately as well as recycling active medication from the expiratory pathways and redirecting it for further inhalation by the patient.

SUMMARY

Accordingly, it is an object of the present invention to overcome these and other drawbacks of the prior art by providing a novel nebulizer gas scavenging system configured to extract and measure the liquid from the expiratory pathway of the breathing circuit.

It is another object of the present invention to provide a novel nebulizer gas scavenging system capable of redirecting at least a portion of the medication exhaled by the patient back into the breathing circuit, thereby improving overall consumption of the medication by the patient.

It is a further object of the present invention to provide a novel nebulizer gas scavenging system configured to minimize the content of medication in the exhaust gases released into the ambient environment from the expiratory pathway of the breathing circuit.

It is a further yet object of the present invention to provide a novel nebulizer gas scavenging system capable of isolating and retaining the liquid extracted from the expiratory gases so it can be properly discarded or further analyzed if needed.

The nebulizer gas scavenging system generally includes an inspiratory pathway leading to a facemask, and an expiratory pathway leading from the facemask. The facemask may be equipped with an inlet one-way valve and an outlet one-way valve to separate the inhalation aerosol from the exhalation gases.

The inspiratory pathway may feature a nebulizer with an input for a medical liquid. The nebulizer is designed to convert the medical liquid coming in from the input thereof to an aerosol suitable for inhalation by the patient. The nebulizer may also be used to supply medicated aerosol through the inspiratory pathway to the facemask.

The expiratory pathway features a condenser configured to extract liquid from expiratory gases originating at the facemask. After passing through a liquid container, the expiratory pathway is further configured to perform at least one of the following actions with the extracted liquid:

- (i) sequester the fluid for subsequent disposal or further analysis,
- (ii) determine at least one parameter of the extracted liquid, such as extracted volume or weight per unit time, or
- (iii) direct the extracted liquid to the input of the nebulizer to increase medication utilization and reducing the overall amount of medication needed for the treatment.

Extracted liquid may be sent to be analyzed for further laboratory evaluation or cultured for presence of bacteria or other pathogens.

The expiratory gas may be further filtered after exiting the condenser and then released to the ambient environment.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through the use of the accompanying drawings, in which:

DETAILED DESCRIPTION OF PREFERRED EMBODIMENTS OF THE INVENTION

Figure 1:
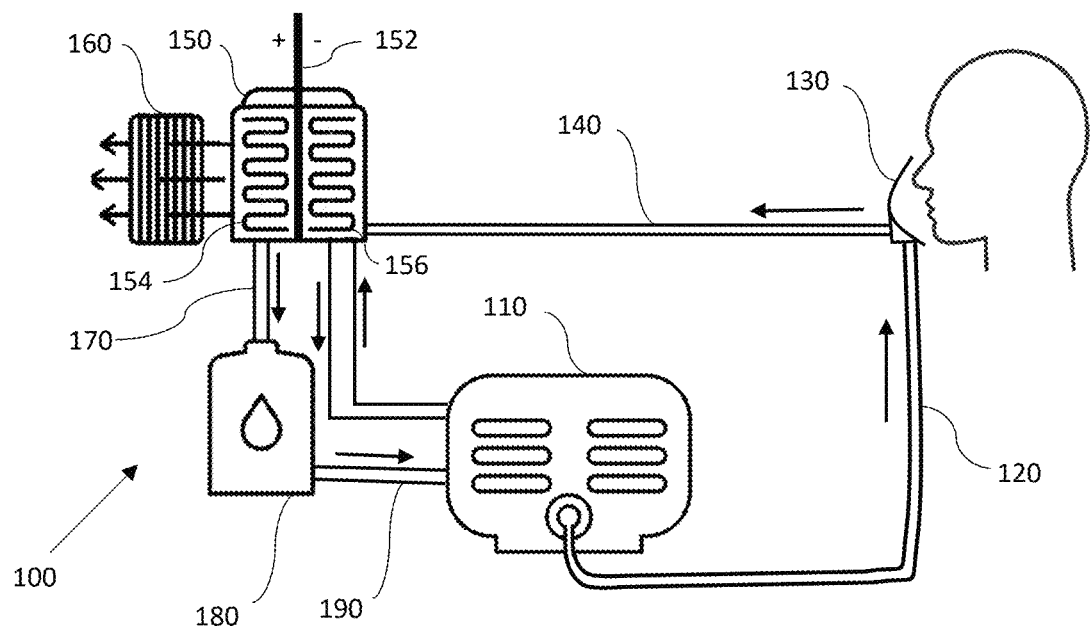
FIG. 1 is a block diagram of the components forming a breathing circuit of the present invention.
Figure 2:
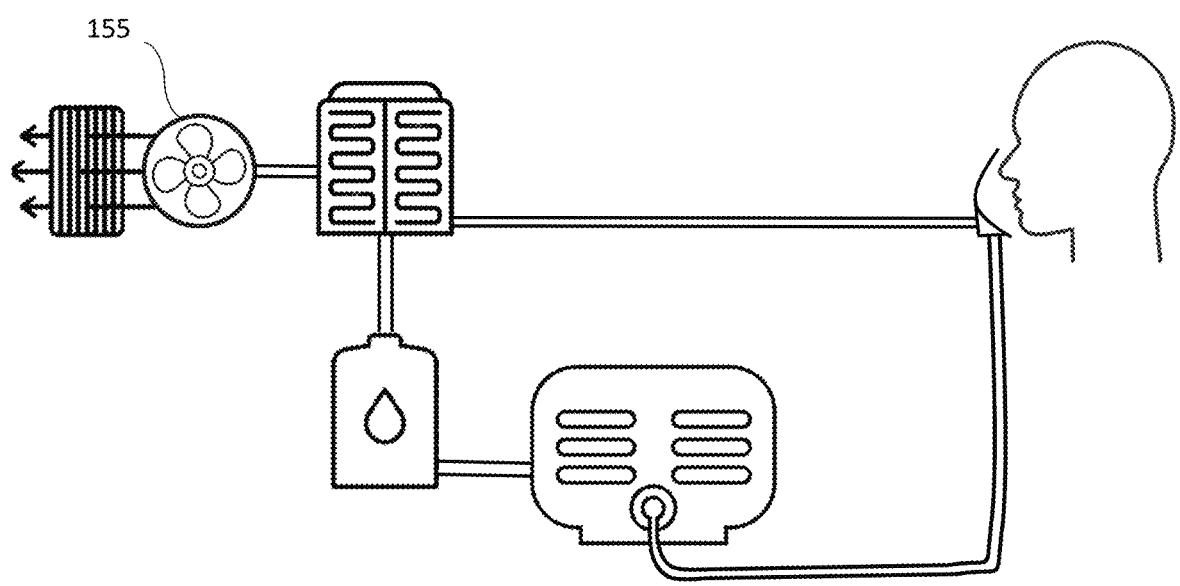
FIG. 2 is the same but with the addition of an air pump.
Figure 3:
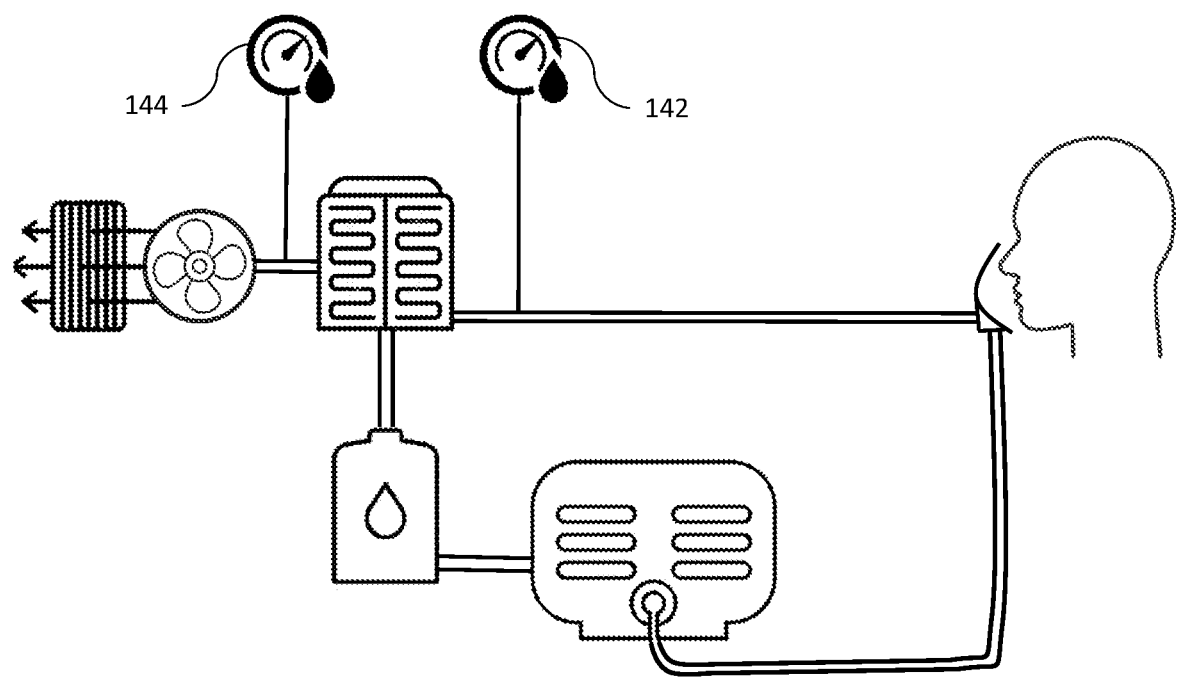
FIG. 3 is the same as in FIG. 2 but with the addition of one or more humidity sensors.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 shows a block diagram of an exemplary configuration of the nebulizer gas scavenger system 100 of the present invention showing a full breathing circuit with an inspiratory pathway and an expiratory pathway as its main components. The desired liquid medication may be dispersed into an aerosol by a nebulizer 110, supplied to a facemask 130 next to the face of the patient via an inspiratory pathway tubing 120, then directed via an expiratory pathway tubing 140 to a condenser 150, where the liquid phase may be separated from the exhaled expiratory gases. The expiratory gases are then released to the ambient environment after passing through a filter 160. The condensed extracted liquid may be collected, optionally filtered, separated by composition (i.e., water vs nebulized medication), measured, disinfected, and/or further concentrated, and then redirected to the inlet of the nebulizer 110, thereby completing the circuit. In other embodiments, the extracted liquid may be sequestered and optionally further analyzed for content and presence of bacteria or other pathogens.

The nebulizer 110 of the system is configured to disperse the desired medication and form an aerosol to allow the patient to breathe in the liquid medication containing thereof. The liquid medication is first loaded into the input of the nebulizer before operating thereof. The nebulizer 110 may be a standalone component or can be combined or consolidated with one or more of the other components of the system as the invention is not limited in this regard. The nebulizer 110 may be configured for use at home or in a hospital setting.

Various types of nebulizers may be used for the purposes of the present invention, including the most widely used jet or ultrasonic nebulizers. In a jet nebulizer, a jet of compressed air is used to create liquid droplets, while in ultrasonic nebulizers, this is achieved by a vibratory motion of an ultrasonic crystal. A broad discussion of nebulizers may be found in a review (P. P. H. Le Brun, A. H. de Boer, H. G. M. Heijerman and H. W. Frijlink. A review of the technical aspects of drug nebulization. *Pharm World Sci* 2000; 22(3): 75-81), which is incorporated herein by reference. Droplet size and other key parameters of operation may be selected based on both patient and specific liquid medication considerations. The liquid medication is supplied to the nebulizer from the input, such as a liquid container, as is well understood by those skilled in the art, which is not shown on the drawing.

Most nebulizers are still deficient in that it is difficult to meter exactly how much liquid medication is dispersed, as well as how much medication is actually consumed by the patient. A switch to dry powder inhalers may allow for better control of medication consumption, which is a large part of the rationale to switch to dry inhalers. However, many liquid medications are not available in a dry powder form which necessitates continuous use of nebulizers in modern medical practice, or the patient is unable to use such an inhaler due to a lack of inspiratory effort ability or coordination/cognitive ability to properly interface with the inhaler. For the purposes of this disclosure, the term "medical liquid" is used to refer to various types of saline, including various concentrations of hypotonic saline, isotonic saline, and hypertonic saline, salt water, distilled water, prescription medications in liquid form, as well as supplement and recreational liquids designed for inhalation, such as CBD/THC products, etc.

The inspiratory pathway 120 may include a simple tubing of sufficient length to connect the nebulizer 110 to the facemask 130. The term "facemask" is used herein to broadly describe all patient interface devices located at or near the face of the patient and configured to preferentially provide the gas flow from the inspiratory pathway 120 for the patient to breath in, while limiting breathing in of room air from the surrounding environment. Examples of what is included in the meaning of this term for the purposes of this disclosure include facemasks, nasal cannulas, intubation tubes and cannulas, mouthpieces, hoods, face shields, etc. Some suitable examples of the facemask may be found in the article by Arzu Ari, Armele Dornelas de Andrade, Meryl Sheard, Bshayer AlHamad, and James B. Fink. Performance Comparisons of Jet and Mesh Nebulizers Using Different Interfaces in Simulated Spontaneously Breathing Adults and Children. *J OF AEROSOL MEDICINE AND PULMONARY DRUG DELIVERY, Vol.* 28, No. 4, 2015, incorporated herein by reference.

The facemask 130 may be equipped with an inlet for connecting the inspiratory pathway 120 thereto. The inlet may be further equipped with an inlet one-way valve so as to assure the direction of flow only from the nebulizer 110 towards the patient as shown by an arrow in FIG. 1.

Expiratory pathway 140 may be provided with sufficient length and diameter to direct at least a sufficiently large portion or in some cases the entirety of the exhalation volume of gas away from the patient and towards the condenser 150. The facemask 130 may have an outlet to which the expiratory pathway 140 may be attached. A second one-way valve may also be provided as part of the facemask 130 or as part of the expiratory pathway 140 and arranged to allow the flow of gases in a direction of the arrow in FIG. 1 and not in the opposite direction—so as to facilitate removal of exhaled expiratory gases from the patient and prevent mixing of the inhalation and exhalation gases.

As may be appreciated by those skilled in the art, at least some or all of the components exposed by the gases inhaled and exhaled by the patient may be made disposable, especially the inspiratory pathway 120, expiratory pathway 140, and the facemask 130.

Condenser 150 may also be provided as part of the breathing circuit of the present invention. The objective of this component is to extract fluids from the high-humidity gas flow exiting the patient. The condenser may be operated using various techniques designed to extract moisture from humid gas. One advantageous technique is to form a cold spot along the pathway of the gas so as to cause condensation of fluids due to the reduction of gas temperature. Desiccants, meshes, baffles, vanes, other gas dehydration, droplet extraction and concentration technologies may also be used for that purpose as the invention is not limited in this regard.

To maximize the efficiency of the condenser, the expiratory gas from the facemask may be directed over through a serpentine or other indirect or convoluted pathway wherein the walls forming the pathway may be made from a head-conductive material, such as metal. Alternatively, the flow of gas may be purposefully slowed down and cooled to permit condensation. A cooling source, for example, may be provided to actively cool the walls of the condenser-such active cooling may be provided at least in one location or throughout the entire length of the convoluted gas pathway of the condenser. In some embodiments, a thermoelectric cooler 152 using a Peltier effect may be deployed. In broad terms, thermoelectric cooling uses the Peltier effect to create a heat flux at the junction of two different types of materials. A Peltier cooler, also known as a thermoelectric heat pump, is a solid-state active heat pump that transfers heat from one side of the device to the other, with consumption of electrical energy, depending on the direction of the current.

While the cooling side 154 of the thermoelectric cooler 152 may be thermally coupled and used to operate the condenser 150, the heater side 156 of that device may be used to warm up the liquid medication prior to or as a part of the nebulizer 110. This is especially beneficial when the entire system is designed as a stand-alone, self-contained device. Heating up the medical liquid from room temperature to at least body temperature or even to somewhat higher temperatures may be used to maximize saturation of the inspiratory gas flow with the desired medication and increase patient comfort.

The condenser 150 may be configured to direct drained liquid droplets that form along the serpentine pathway down to the bottom fluid trap of the device. This may allow the fluid to transport by a natural (by gravity) or an actively managed flow from the condenser 150 to the liquid container 180 via a drain pathway 170. The extracted liquid may be sequestered and prepared for proper disposal. In other embodiments, the extracted liquid may undergo additional laboratory analysis or be subjected to a test for cultured bacteria or other pathogens.

The liquid container 180 may be physically located below the condenser 150 to facilitate passive, gravity-controlled liquid drainage. To further facilitate the drainage of the liquid drops away from the walls of the condenser 150, it may be equipped with a device causing the walls to periodically or continuously vibrate via an electrically-activated vibration element, thereby causing the coalescence of smaller drops into larger drops and forming streams of fluid inside the condenser. This promotes liquid drainage from the condenser 150. The vibration element may be coupled to the wall of the convoluted pathway and include a rotating off-center mass or a piezoelectric element configured to apply vibrations thereto. The metal or other portions of the internal serpentine pathway or the entire breathing circuit may be made removable and detachable from each other so as to facilitate their cleaning and sterilization, such as by an autoclave, STERRAD, or an ethylene oxide, which can be done between patients to prevent cross-contamination.

In further embodiments, the condenser 150 may be configured to allow not one but multiple passes of the expiratory gases over the cold elements thereof so as to further improve the efficiency of liquid extraction.

The flow of expiratory gas after passing through the condenser 150 may be directed to a filter 160, such as a HEPA filter, a UV light, or another suitable filtration, disinfection, and/or adsorption device configured to remove harmful pathogens such as viruses and bacteria from the expiratory pathway 140. After disinfecting the gas flow in the filter 160, it may be released into ambient environment or exhausted into a dedicated circuit.

In further embodiments, a hospital vacuum system may be used in place of the exhaust fan to create the necessary pressure gradient, promote the flow of expiratory gases through the expiratory pathway 140 and safely remove all gases from the breathing circuit.

Liquid container 180 may be configured to provide a variety of additional functions. First, liquid metering may be provided as a function of time, which may be instrumental to determine the overall medication consumption by the patient. Liquid metering may be accomplished by including a weight measuring device configured to weigh incoming fluids. Liquid metering may also be accomplished by volume measurements, density measurements, or subjected to further spectral analysis.

Second, the liquid may be disinfected or decontaminated before redirecting thereof towards the nebulizer 110. This may be done by filtering or using other disinfection means, for example by exposing the passing liquid to a sufficient dose of UV light so as to cause the destruction of bacteria, viruses, and other harmful pathogens. To assure the safety of people around the machine, a disinfection chamber may be located inside the device and be covered by an opaque material on all sides so as to preclude exposure of humans to the UV light of a broad-spectrum wavelength or a particular wavelength targeted at a specific group of pathogens or bacteria. One example of a useful specific wavelength range is a so-called UVC range of frequencies of about 165-180 nm designed to disrupt DNA or RNA structure of bacteria or virus. Selection and operation principled of bactericidal UV lights are well known in the art to cause sufficient disinfection of the fluid, which is expected to be naturally transparent to allow deeper penetration of UV rays therein.

As a further additional function of the liquid container 180, water removal and increase in the concentration of the liquid medication may be further provided. This may be accomplished by centrifugation, water evaporation, selective filtering, or using other known techniques as the invention is not limited in this regard. The extracted liquid may be concentrated to a level matching that of the original medication solution provided at the input of the nebulizer 110.

Liquid medication extracted from the expiratory pathway in the liquid container 180 and refined using the above steps may be further directed to the nebulizer 110 via a return pathway 190, where it can be mixed with the new liquid medication or combined into the aerosol mix created therein by other means. The newly created aerosol may then be directed back into the inspiratory pathway 120 for inhalation by the patient.

FIG. 2 shows a further embodiment of the invention in which an active air pump 155 is added to the expiratory part of the circuit. The pump 155 may be operated in a continuous mode, for example, as a centrifugal or another rotary air pump. This may be used to create a predefined suction level in the expiratory pathway so as to facilitate the movement of expiratory gases through that portion of the circuit. In other embodiments, the air pump 155 may be a displacement pump, such as a periodically expanded and collapsed bellows in one example. This type of air pump may be operated asynchronously or, in other embodiments, in synchrony with the breathing rate of the patient by expanding during the expiratory portion of the patient's breathing cycle. A further option for the active air pump 155 is to attach the expiratory portion of the breathing circuit to the hospital vacuum system which may be adjusted to create a sufficient level of vacuum as to remove all expiratory gases safely.

In further yet configuration of the circuit, a second air pump may be used on the inspiratory portion of the circuit and may be used to meter a specific amount of aerosol-containing gas flow to reach the patient.

FIG. 3 shows yet another embodiment of the present invention in which one or more sensors are provided in the expiratory or, in other embodiments, in the inspiratory portion of the breathing circuit. As seen in FIG. 3, the first sensor 142 may be provided before the condenser 150, and the second sensor 144 may be provided after the condenser 150. The sensor may be a humidity sensor, in one example. Detection of a humidity level before and after the condenser 150 may be useful in the determination of the total volume of liquid extracted from the gas flow. This information may then be used in calculating the total volume of consumed medication by the patient.

Another arrangement of the sensors may include color measurement of the inspiratory pathway and comparing that to the color measurement of the expiratory pathway. If the liquid medication has a known color, the difference in these measurements may further be used to estimate the medication consumption with greater precision as compared to the devices of the prior art.

Additional sensors may also be featured at locations both before and after the condenser 150, such as weight sensors, wavelength determination sensors, spectrometer sensors, etc, as the invention is not limited in this regard.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic (s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, Aft AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, Aft BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A nebulizer gas scavenging system comprising:
   an inspiratory pathway leading to a facemask, and an expiratory pathway leading from the facemask,
   wherein the inspiratory pathway further comprises a nebulizer with an input for a medical liquid, the nebulizer is configured to convert the medical liquid to an aerosol suitable for inhalation and to supply thereof through the inspiratory pathway to the facemask,
   wherein the expiratory pathway further comprises a condenser configured to extract liquid from expiratory gases originating at the facemask, wherein the condenser comprises:
   a convoluted, actively cooled flow pathway for expiratory gases,
   a drain configured to direct the liquid extracted from the expiratory gases to a liquid container, thereby separating the extracted liquid from the expiratory gases,
   a thermoelectric cooler using a Peltier effect, which, in turn, comprises a cooling side thermally coupled to the convoluted pathway of the condenser, and a heater side configured to warm the medical liquid of the nebulizer,
   wherein the expiratory pathway with the condenser therein is further configured to perform at least one of the following actions with the extracted liquid:
   (i) sequester the extracted liquid for subsequent disposal,
   (ii) determine at least one parameter of the extracted liquid, or
   (iii) direct the extracted liquid to the input of the nebulizer.

2. The nebulizer gas scavenging system as in claim 1, wherein the facemask is equipped with a one-way inlet valve attached to the inspiratory pathway and configured to allow inhalation of the aerosol, the facemask is further equipped with a one-way outlet valve for directing exhaled expiratory gases from the facemask to the expiratory pathway attached thereto.

3. The nebulizer gas scavenging system as in claim 1, wherein the condenser further comprises a vibration element coupled to a wall of the convoluted pathway and configured to apply vibration thereto, thereby causing coalescence of liquid droplets to promote liquid drainage therefrom.

4. The nebulizer gas scavenging system as in claim 1, wherein the convoluted pathway is removable from the condenser to allow cleaning and sterilization thereof.

5. The nebulizer gas scavenging system as in claim 1, wherein the nebulizer, the condenser, and the thermoelectric cooler are integrated as a stand-alone self-contained device.

6. The nebulizer gas scavenging system as in claim 1 further comprising a drain pathway for directing liquid extracted from the expiratory gases by the condenser to the liquid container.

7. The nebulizer gas scavenging system as in claim 6, wherein the liquid container is configured to have an input from the drain pathway and an output in fluid communication with an input of the nebulizer.

8. The nebulizer gas scavenging system as in claim 7, wherein the liquid container is located below the condenser so as to facilitate passive, gravity-controlled liquid drainage from the condenser into the liquid container.

9. The nebulizer gas scavenging system as in claim 1, wherein the liquid container is configured for metering a volume or a weight of the extracted liquid as a function of time, thereby enabling determination of the overall consumption of the medical liquid inhaled from the nebulizer gas scavenging system.

10. The nebulizer gas scavenging system as in claim 1, wherein the liquid container is configured for disinfecting the extracted liquid.

11. The nebulizer gas scavenging system as in claim 10, wherein liquid disinfection at the liquid container is achieved by filtering or exposing to a bactericidal UV light.

12. The nebulizer gas scavenging system as in claim 1, wherein the liquid container is further configured for removal of water and increasing concentration of medical liquid contained in the extracted liquid.

13. The nebulizer gas scavenging system as in claim 12, wherein removal of water is done via water evaporation or liquid centrifugation.

14. The nebulizer gas scavenging system as in claim 1, wherein the expiratory pathway further comprises an air pump or configured for attachment to a hospital vacuum system to promote a flow of expiratory gases therein.

15. The nebulizer gas scavenging system as in claim 1 further comprising at least one sensor located in the expiratory pathway before or after the condenser.

16. The nebulizer gas scavenging system as in claim 15, wherein the at least one sensor is a humidity sensor.

17. The nebulizer gas scavenging system as in claim 15, wherein the expiratory pathway comprises two sensors positioned before and after the condenser, the two sensors are configured to determine a total volume of liquid extracted from the expiratory gases by the condenser.

18. A nebulizer gas scavenging system comprising:
   an inspiratory pathway leading to a facemask, and an expiratory pathway leading from the facemask,
   wherein the inspiratory pathway further comprises a nebulizer with an input for a medical liquid, the nebulizer is configured to convert the medical liquid to an aerosol suitable for inhalation and to supply thereof through the inspiratory pathway to the facemask,
   wherein the expiratory pathway further comprises a condenser configured to extract liquid from expiratory gases originating at the facemask, and two sensors located in the expiratory pathway before or after the condenser, the two sensors are configured to determine a total volume of liquid extracted from the expiratory gases by the condenser, wherein the expiratory pathway with the condenser therein is further configured to perform at least one of the following actions with the extracted liquid:
  (i) sequester the extracted liquid for subsequent disposal,
  (ii) determine at least one parameter of the extracted liquid, or
  (iii) direct the extracted liquid to the input of the nebulizer.

\* \* \* \* \*